United States Patent [19]

Stinaff

[11] 4,246,946
[45] Jan. 27, 1981

[54] FENDER CLEANING TIRE COMPONENT

[76] Inventor: Girdwood L. Stinaff, 56 Goodhue Dr., Akron, Ohio 44313

[21] Appl. No.: 909,372

[22] Filed: May 25, 1978

[51] Int. Cl.³ .............................................. B60C 19/00
[52] U.S. Cl. ..................................... 152/151; 152/212
[58] Field of Search ............... 152/151, 154, 221, 222, 152/353 R, 330 R, 212, 208; 15/179

[56] References Cited

U.S. PATENT DOCUMENTS 1,217,619  2/1917  Molin ................................... 152/212
2,301,809  11/1942  Ovalle ................................. 152/212

Primary Examiner—Robert B. Reeves
Assistant Examiner—Gene A. Church
Attorney, Agent, or Firm—Dowell & Dowell

[57] ABSTRACT

A component of a pneumatic vehicle tire comprising a multiplicity of whip-like filaments or flagella attached to and arranged circumferentially of the tire and adapted to be thrown radially outward by centrifugal force into contact with the undersurface of the adjacent fender or mud-guard for cleaning the same.

9 Claims, 12 Drawing Figures

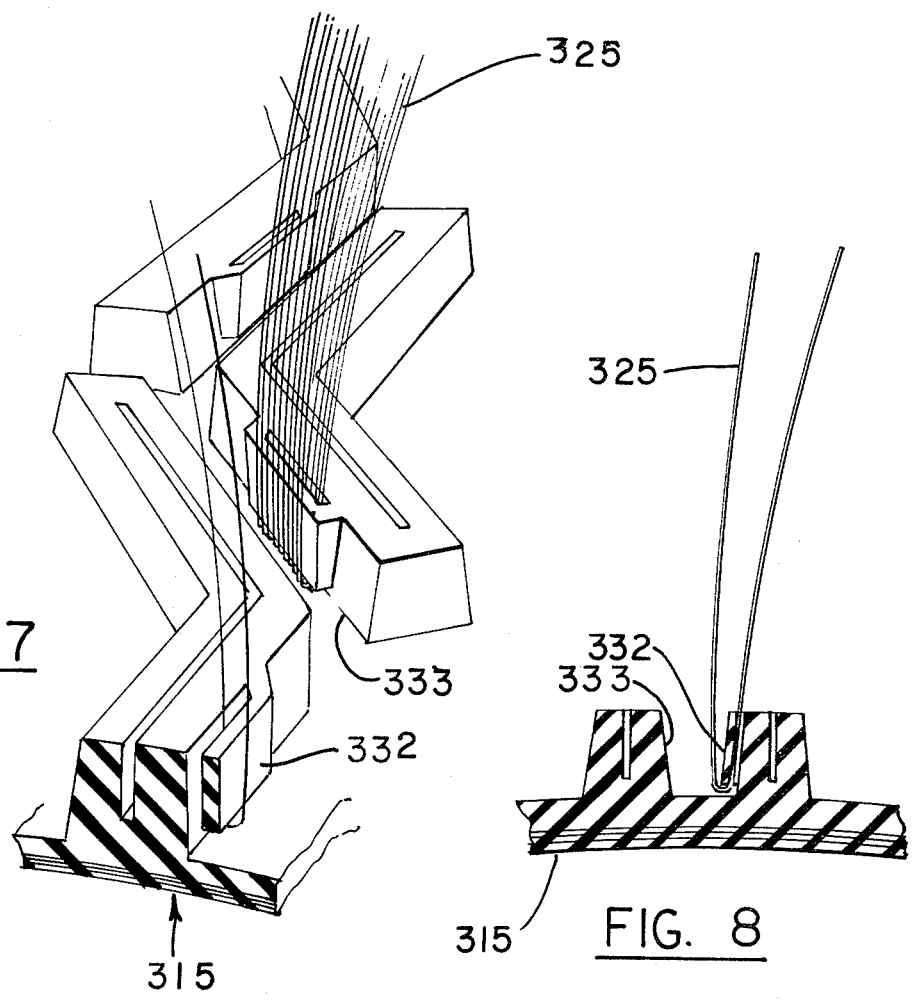

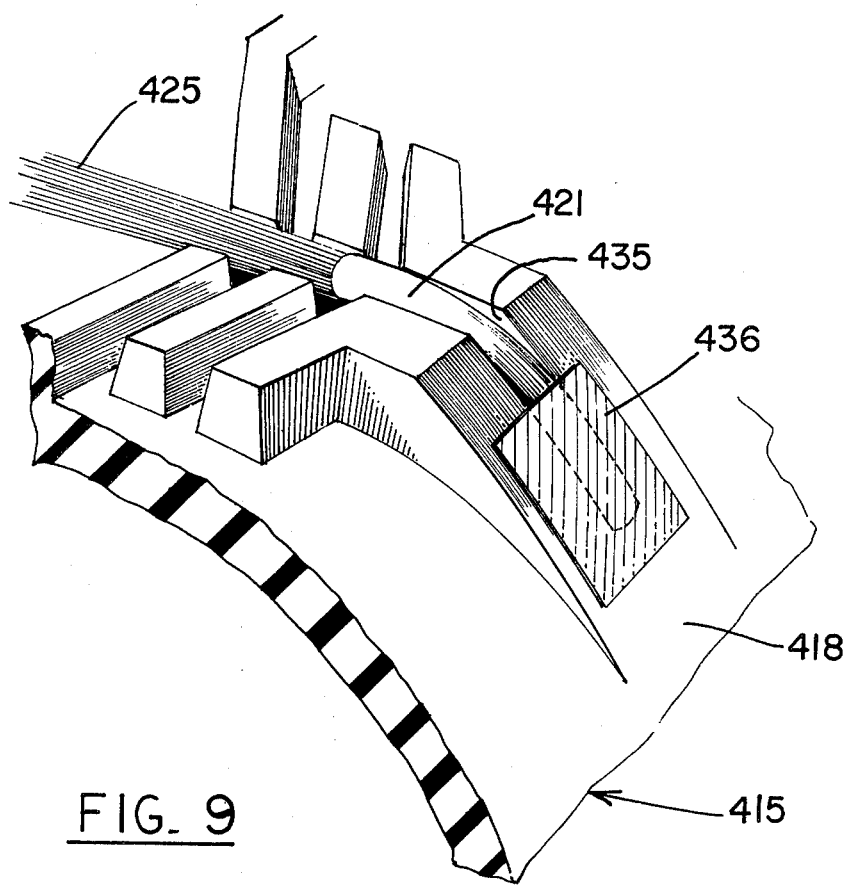
FIG. 9
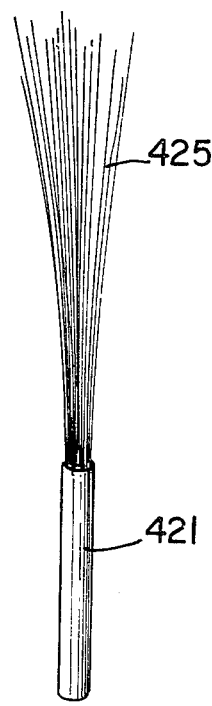
FIG. 10
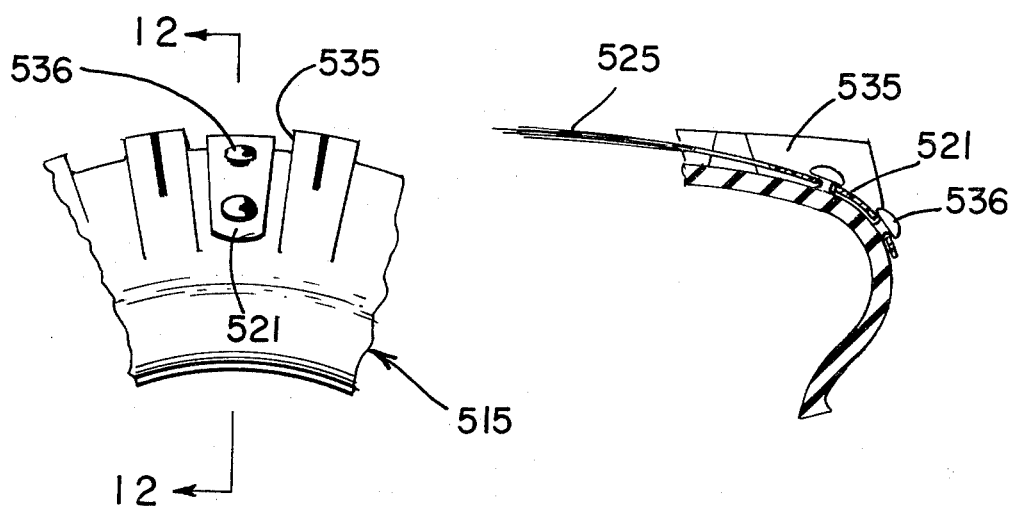
FIG. 11
FIG. 12

FENDER CLEANING TIRE COMPONENT

BACKGROUND OF THE INVENTION

In the winter season in northern climes pneumatic tires used on vehicles throw snow, ice mixed with salt and debris onto the undersurfaces of the fenders or mud-guards where it collects and builds up to the extent of impeding mobility and steering of the vehicle. Moreover, the accumulated mixture containing salt and moisture rapidly corrodes and deteriorates the metal of the fenders and adjacent chassis parts. If the vehicle is parked outdoors, most of the accumulation stays on the metal and continues its corroding action as the weather moderates sufficiently to thaw the mixture, and by that time a surface coating of the corroding mixture is caked on the surface and does not drop off even though thawed.

SUMMARY OF THE INVENTION

It is an object of the present invention to provide a novel and improved pneumatic tire component having whip-like filaments which when the tire is rotated will be extended radially by centrifugal force to slice off deposits of snow, ice, salt and foreign matter from the undersurface of an adjacent fender or mud-guard.

Another object is to provide a system of radially extendable whip-like filaments arranged circumferentially of a pneumatic tire, which filaments are preferably detachably mounted on the tire.

A further object is to provide a system of radially extendable whip-like filaments arranged circumferentially of the exterior of a tire tread and adapted to prevent build-up of snow, ice, salt and debris on the undersurface of an adjacent fender when the tire is rotated, thereby generating air-drying circulation.

Another object is to provide a system of components arranged circumferentially of a tire and adapted to be mounted in depressions in the tread thereof, said components each having radially extendable whip-like filaments for removing built-up foreign matter from the undersurface of an adjacent fender.

A still further object is to provide an improved system of radially-extendable whip-like filaments on the exterior of a pneumatic tire which filaments can be easily adjusted as to the proper length for removing built-up foreign matter from the undersurface of an adjacent fender.

These and other objects are accomplished by the improvements comprising the present invention, preferred embodiments of which are shown by way of example in the accompanying specification as embodying the best known mode of carrying out the invention, said embodiments being described in detail in the following specification. Various modifications and changes in details of construction are comprehended within the scope of the appended claims.

BRIEF DESCRIPTION OF DRAWINGS

FIG. 7 is a partial view of a tire tread of still another design, showing the filaments looped under ribs in the tread.

FIG. 8 is a cross-sectional view of a portion of the tread of FIG. 7.

FIG. 9 is a partial perspective view of a tire tread of another design showing still another modification of the improved components and manner of securing them in the tread.

FIG. 10 is a detached view of the components of FIG. 9.

FIG. 11 is a partial side elevation of another tire tread with slightly modified components therein.

FIG. 12 is a cross-sectional view on line 12—12 of FIG. 11.

DESCRIPTION OF PREFERRED EMBODIMENTS

Figure 1:
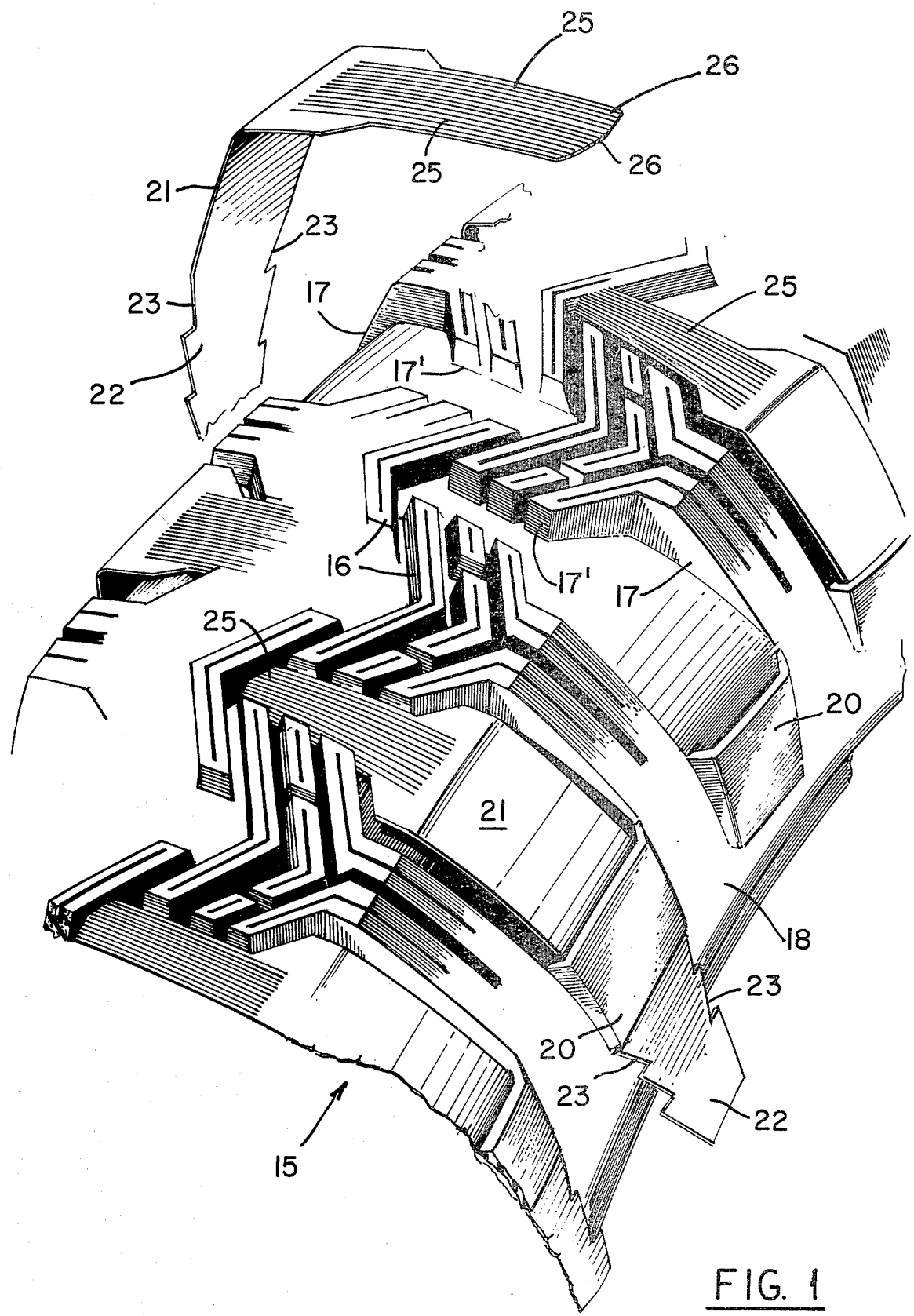
FIG. 1 is an exploded perspective view of a portion of a pneumatic tire casing with one embodiment of the improved components applied thereto.

Referring to FIG. 1, a preferred embodiment of the invention shown is applied to a tire casing indicated in general at 15 having a tread comprising a pattern of V-shaped ribs 16 forming a row of transverse recesses 17 on each side of the tread, the recesses in each row being staggered with respect to the recesses in the opposite row. As shown, the recesses 17 have portions 17' of reduced width in the central area of the tread, and the wider portions 17 taper in depth and die out in the sidewalls 18 of the tire.

Preferably, the sidewalls 18 of the tire are provided with sockets adjacent to and aligned with the laterally outer ends of the recesses 17, and these may be formed by U-shaped strips 20 of elastomeric material having their side edges integral with or adhered to the side walls. The strips 20 may be of the same material as the tire casing or a material compatible therewith.

Flexible straps 21, preferably of elastomeric material, are designed to fit in the recesses 17, and have outer terminal portions 22 for sliding into and through the sockets formed by strips 20. Preferably, the side edges of the portions 22 have serrations 23 in their side edges for retaining the portions 22 within strips 20. Obviously, the terminal portions 22 of the straps 21 could be otherwise secured to the sidewalls 18.

The upper or laterally inner ends of the straps 21 are each provided with a plurality of whip-like filaments or flagella 25 of durable material such as nylon. The filaments 25 may be arranged in a flat band of a width adapted to fit in the narrow recesses 17', being secured, as by molding, at one end in the inner ends of straps 21 with their opposite ends free. As shown, the flagella 25 may have beads 26 formed on their free ends.

It will be apparent that when the tire 15 is mounted on a conventional vehicle or automobile and the vehicle is driven, rotation of the tire will generate centrifugal force causing the straps 21 and the free ends of the filaments 25 to be thrown radially outward of the tire. The lengths of the straps and filaments are designed and adapted to contact and shear off snow or ice and mixtures thereof with salt and debris or foreign matter which accumulate on the undersurface of the fender or mud-guard adjacent to and partially engirdling the tire on the conventional automobile. The lengths of fliaments 25 are easily varied to accommodate the distance between the tire and adjacent fender.

Once the accumulation has been removed, the continuous rotation of the filaments produces a circulation of air to dry off the fender and retard further build-up. The straps 21 are easily removed at the end of the winter season and replaced at the beginning of the next winter season.

Figure 2:
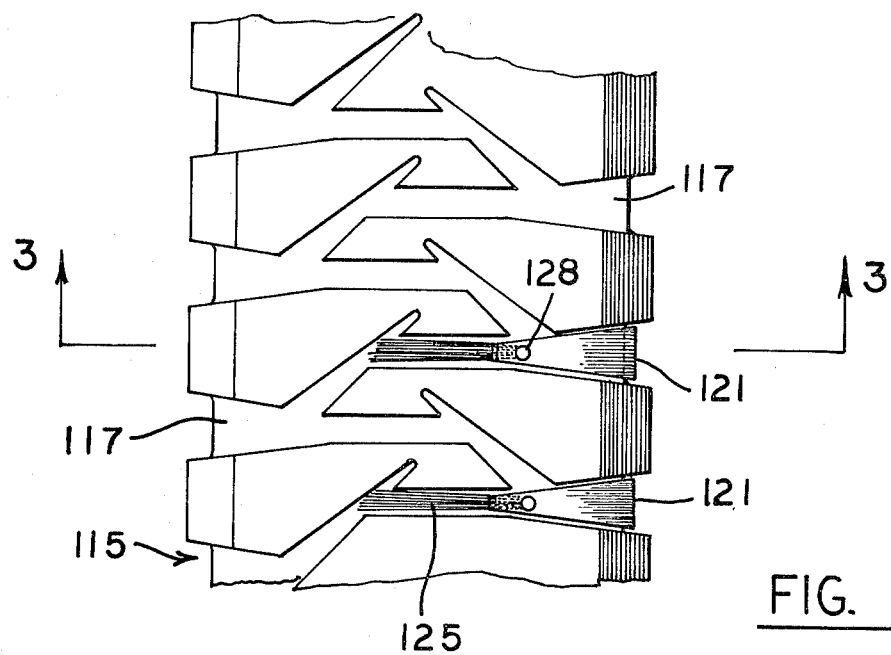
FIG. 2 is a plan view of a portion of a tire tread of different design having a modification of the improved components applied thereto.
Figure 3:
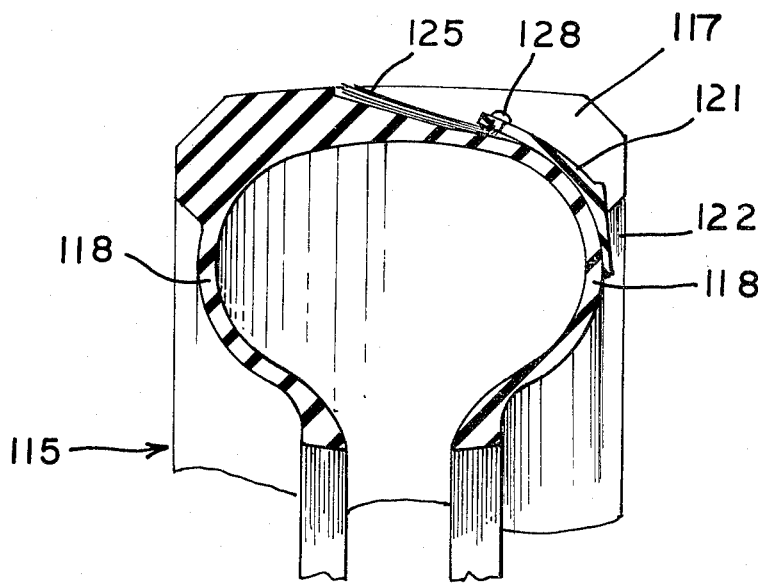
FIG. 3 is a cross-sectional view on line 3—3 of FIG. 2.

Referring to the embodiment of FIGS. 2 and 3, the tire casing 115 has a somewhat different design providing two staggered rows of recesses 117 in the tread, and the straps 121 fitting in the recesses 117 have their outer terminal portions 122 secured to the sidewalls 118 by adhesive cement or the like. The groups of whip-like filaments 125 may be secured at one end to the laterally inner ends of the straps 121 by knobs 128 or the like.

Figure 4:
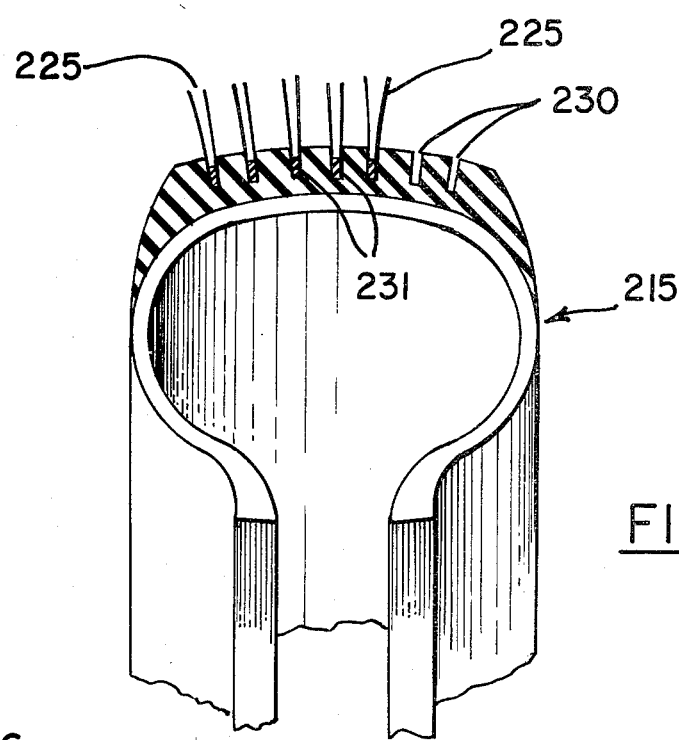
FIG. 4 is a cross-sectional view of a tire tread of different design having circumferential grooves showing another modified form of the improved components mounted in the grooves.
Figure 5:
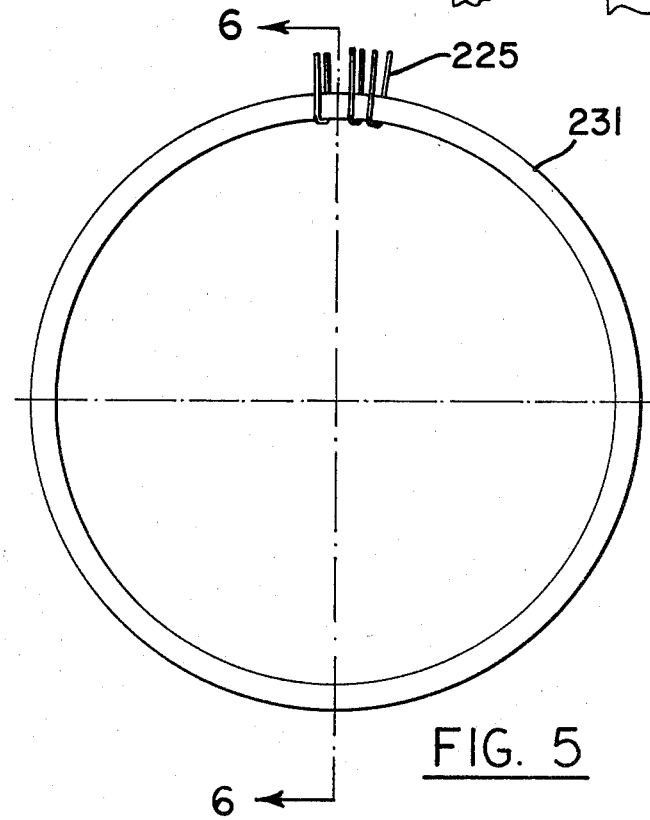
FIG. 5 is a detached view of one of the rings utilized to mount the filaments in the tire grooves, and showing how the filaments are held thereby.
Figure 6:
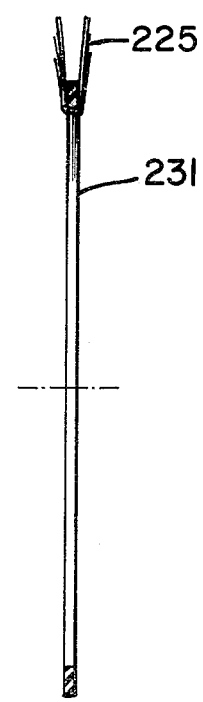
FIG. 6 is a cross-sectional view on line 6—6 of FIG. 5.

Referring to the embodiment of FIGS. 4–6, the tire casing 215 has a tread portion provided with continuous circumferential grooves 230. In this embodiment rows of the whip-like filaments or flagella 225 are secured at one end in the grooves 230 and extend radially outward therefrom, preferably continuously around the circumference of the tire. Obviously, the lengths of the filaments 225 are designed to contact and shear off built-up snow and ice and mixtures thereof with salt and foreign matter from the undersurface of an adjacent fender or mud-guard partially engirdling the tire, when the tire is rotated.

As shown, the rows of filaments 225 may be detachably secured in the grooves 230 by means of elastic hoops 231 designed to be inserted in or removed from the grooves by radial expansion. The filaments 225 may be looped at their inner end portions around the hoops 231, as shown in FIGS. 5 and 6.

In the embodiment of FIGS. 7 and 8, the filaments 325 are secured in groups at their inner ends to ribs 332 occurring at circumferential intervals in the tread of tire casing 315. As shown, the ribs 332 are spaced above the bottoms of zig-zag grooves 333 in the tread, so that the filaments 325 may be looped at their inner end portions around the ribs 332.

The embodiments of FIGS. 9 and 10 and 11 and 12 are similar in concept to the embodiments of FIG. 1 and FIGS. 2 and 3. Tire casing 415 in FIGS. 9 and 10 has transverse grooves or recesses 435 in the tread portion which die out in the sidewalls 418, and the terminal portions of cylindrical straps 421 are secured in the laterally outer portions of the grooves 435 by suitable means such as adhesive strips 436. Groups of filaments 425 are secured to or molded in the other ends of straps 421 and adapted to fit in the grooves 435 and to be thrown radially outward when the tire is rotated.

Tire casing 515 in FIGS. 11 and 12 has transverse grooves 535 in the tread portion and straps 521 detachably secured in the grooves by means of studs or knobs 536. The laterally inner ends of the straps 521 are secured to the ends of groups of the filaments 525 having lengths designed to clean off built-up accumulations of snow, ice and foreign matter on an adjacent fender.

It should be apparent that an inexpensive, novel and effective tire component has been provided for cleaning off accumulated foreign matter from an adjacent fender or mud-guard, by utilizing a multiplicity of whip-like filaments detachably secured to tires of various tread designs for easy attachment to and removal therefrom.

What is claimed is:

1. An apparatus for use with a vehicle tire for cleaning foreign material deposits from the fender wells of the vehicle comprising at least one elongated flexible filament means having first and second end portions, hoop means for mounting said first end portion of said filament means on the vehicle tire, said hoop means being of a circumference to cooperatively engage the periphery of the vehicle tire, said filament means being of a length to extend to a position radially of said tire, and said second end of said filament means being radially movable outwardly of the tire by centrifugal action as the tire is rotated, whereby said second end portion of said filament means engages and dislodges foreign material collecting on the fender well as the tire is rotated.

2. The invention of claim 1 in which said hoop means is formed of elastomeric material.

3. An apparatus for use with a vehicle tire for cleaning foreign material deposits from the fender wells of the vehicle comprising at least one elongated strap means having first and second end portions, means for mounting said first end portion on the vehicle tire, said second end portion of said strap means having at least one elongated flexible filament means extending therefrom, said filament means being radially movable outwardly from the vehicle tire and towards the fender well by centrifugal action as the tire is rotated, whereby said filament means engages and dislodges foreign material collecting on the fender well of the vehicle.

4. The invention of claim 3 in which a plurality of flexible filament means extend from said second end portion of said strap means.

5. The invention of claim 3 in which said strap means is adjustably received by said means to mount said first end portion of said strap means so said filament means may be selectively adjusted radially of said tire.

6. The invention of claim 3 in which said means to mount said first end portion of said strap means on the vehicle tire includes a plurality of U-shaped brackets circumferentially spaced about and mounted on the tire and said first end portion of said strap means includes locking means for being selectively and adjustably received within said brackets.

7. The invention of claim 6 in which said locking means of said first end portion of said strap means includes opposed serrated edges spaced along the length of said first end portion, whereby said serrated edges are adapted to cooperatively engage said U-shaped brackets.

8. The invention of claim 3 in which said means to mount said first end portion of said strap means to said vehicle tire is formed integrally with the tire.

9. The invention of claim 3 in which said means to mount said first end portion of said strap means to said tire includes stud means circumferentially spaced about the tire and said first end portion of said strap means being removably mounted to said stud means.

* * * * *